United States Patent
Tarrant et al.

(10) Patent No.: US 12,293,326 B2
(45) Date of Patent: May 6, 2025

(54) INVENTORY EVENT BASED MOVEMENT OF RFID TAGGED ITEMS

(71) Applicant: SENSORMATIC ELECTRONICS, LLC, Boca Raton, FL (US)

(72) Inventors: Declan Tarrant, Killorglin (IE); Matthew Marchesano, Laguna Niguel, CA (US); David Patrick McCullough, Rancho Santa Margarita, CA (US); Jay Lickfett, San Diego, CA (US); Mayuri Sarupuri, Brea, CA (US); Suresh Kumar, Ladera Ranch, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 166 days.

(21) Appl. No.: 16/878,337

(22) Filed: May 19, 2020

(65) Prior Publication Data
US 2020/0372449 A1    Nov. 26, 2020

Related U.S. Application Data

(60) Provisional application No. 62/850,325, filed on May 20, 2019.

(51) Int. Cl.
G06Q 10/087    (2023.01)
G06K 7/10      (2006.01)
G06Q 20/20     (2012.01)

(52) U.S. Cl.
CPC ....... *G06Q 10/087* (2013.01); *G06K 7/10099* (2013.01); *G06Q 20/203* (2013.01); *G06K 7/10386* (2013.01)

(58) Field of Classification Search
CPC .. G06Q 10/087; G06Q 10/08; G06K 7/10099; G06K 7/10386
See application file for complete search history.

(56) References Cited

U.S. PATENT DOCUMENTS

| 9,785,879 B1 | 10/2017 | Lauria et al. | |
| 2003/0216969 A1* | 11/2003 | Bauer | G06K 17/00 |
| | | | 705/22 |

(Continued)

FOREIGN PATENT DOCUMENTS

WO    2014151935 A2    9/2014

OTHER PUBLICATIONS

Internation Search Report and Written Opinion issued in International Patent Application No. PCT/US2020/033853 on Jul. 31, 2020.

*Primary Examiner* — Florian M Zeender
*Assistant Examiner* — Vanessa Deligi
(74) *Attorney, Agent, or Firm* — ArentFox Schiff LLP

(57) ABSTRACT

Aspects of the present disclosure provide streamline techniques to alert sales personal/associate of an item in need of replenishment on the sales floor or in the stock room, and provide real-time data indicating units of an item within a retail location. The present disclosure provides a method, system and computer readable medium for inventory management utilizing radio-frequency identification (RFID) technology. The method may include detecting a first signal from an electronic product code (EPC) tag at a first location; generating a value of an inventory count based on the first signal; detecting a second signal from the EPC tag at a second location; updating the value of the inventory count based on the second signal; comparing the updated value to a threshold value, and when the updated value meets the threshold; and sending a notification of a task to a mobile device.

14 Claims, 4 Drawing Sheets

(56) References Cited

U.S. PATENT DOCUMENTS

| | | | |
|---|---|---|---|
| 2010/0187306 A1* | 7/2010 | Solomon | B65G 1/127 |
| | | | 235/385 |
| 2011/0153614 A1* | 6/2011 | Solomon | B65G 1/127 |
| | | | 707/769 |
| 2012/0161967 A1* | 6/2012 | Stern | G06Q 10/087 |
| | | | 340/572.1 |
| 2014/0279294 A1* | 9/2014 | Field-Darragh | H04B 5/77 |
| | | | 705/28 |
| 2016/0307148 A1* | 10/2016 | Jones | G06Q 20/203 |
| 2018/0060943 A1* | 3/2018 | Mattingly | G06Q 20/12 |
| 2018/0181906 A1* | 6/2018 | Baduge | G06Q 10/087 |
| 2018/0308041 A1* | 10/2018 | Sundholm | G06Q 30/0639 |
| 2019/0057343 A1* | 2/2019 | Chan | G06Q 10/087 |
| 2019/0012487 A1 | 4/2019 | Jones et al. | |
| 2019/0272497 A1* | 9/2019 | Tingler | G06Q 10/087 |

\* cited by examiner

INVENTORY EVENT BASED MOVEMENT OF RFID TAGGED ITEMS

CROSS REFERENCE TO RELATED APPLICATIONS

This application claims priority to U.S. Patent Provisional Application No. 62/850,325, filed May 20, 2019, the entire contents of which is hereby incorporated in its entirety.

TECHNICAL FIELD

The present disclosure relates generally to inventory management utilizing radio-frequency identification ("RFID") technology to manage products containing electronic product code ("EPC") tags, and more specifically to generating replenishment notifications based upon product counts reaching predetermined threshold levels.

BACKGROUND

In recent years, retailers (e.g., apparel retailers) have deployed a radio frequency identification system in stores to track product movements. For example as product arrives at stores, the product is placed on display on the sales floor, and are sold. By using RFID technology, retailers are able to reduce the amount of time that store employees spend counting the inventory of product (e.g., manually counting inventory that is on the floor and in stock room), as well as increase merchandise visibility within each store, thereby enabling shoppers in the store and online to find what they seek, at the location where they need it.

Stores utilizing RFID technology for inventory management employ either overhead readers that capture all of the tags within a specified area or zone, or handheld readers operated by sales personnel to conduct periodic inventory counts. The RFID technology captures each specific EPC tag that may comprise unique identification and location information, and this large amount of data is compiled into a database. These specific EPCs indicate more information than sales personnel need when assisting a customer requesting a product. For instance, a red shirt in size medium identified as the fourth one of this type, is in stock. Additionally, in order to keep the inventory data up-to-date, scans must be conducted regularly and often. This process of capturing all EPC tags can be both time consuming and data consuming, as the entire inventory of a store (both on the sales floor and in the stock rooms), must be scanned and processed.

In either case, sales personnel (or in some cases customers) of the retailers cannot determine in real-time if inventory counts of a specific product are correct, but rather must rely on data from the most recent full inventory scan. For instance, the sales personnel or customers cannot determine at a specific moment if products are in stock, out of stock, in stock but not on the sales floor, in stock on the sales floor but out of stock in the stock room, in stock but in two separate locations in the retailer, etc. Such errors can mean that replenishment of products on the sales floor would not occur when it should, and that merchandise would not be available for customers when needed.

To resolve this problem, retailers have generally relied on sales personnel to periodically scan locations with handheld readers in order to update the inventory database of a specific product. However, such processes for retailers may be expensive, time consuming and wasteful of sales personnel time. Other potential solutions have focused on updating the database when a specific item is purchased. However, current algorithms still suffer from incorrect readings and allocation of inventory.

SUMMARY

Aspects of the present disclosure provide streamline techniques to alert a store employee or associate of an item in need of replenishment on the sales floor or in the stock room, and provide real-time data indicating units of an item within a retail location.

In one example, a method for inventory management utilizing RFID technology is disclosed. The method may include detecting, via an antenna of a first RFID reader, a first signal from an electronic product code ("EPC") tag at a first location. The method may further include generating, via a processor, a value of an inventory count based on the first signal. The method may further include detecting, via an antenna of a second RFID reader, a second signal from an EPC tag at a second location. The method may further including updating, via the processor, the value of the inventory count based on the second signal. The method may further include comparing, via the processor, the updated value to a threshold value, and when the updated value meets the threshold. The method may further including sending, via a processor, a notification of a task to a mobile device.

In another example, an apparatus for inventory management utilizing RFID technology is disclosed.

In another example, a non-transitory computer readable medium for inventory management utilizing RFID technology is disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described in more detail with reference to the FIGS. 1-4. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
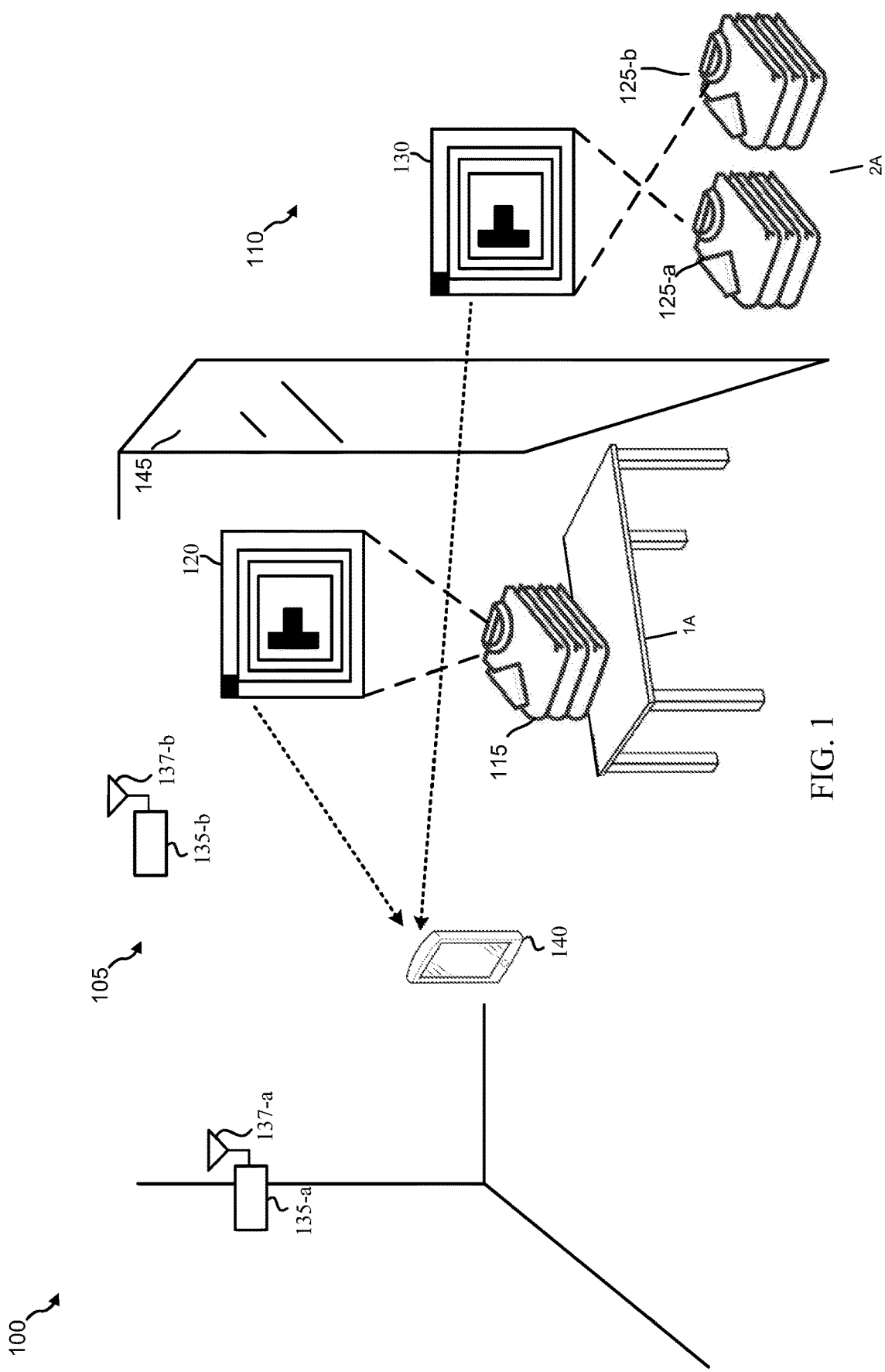
FIG. 1 is a diagram illustrating an example of a retail store employing an inventory management system in accordance with aspects of the present disclosure.

FIG. 1 is a diagram illustrating an example of a retail store employing an inventory management system 100 in accordance with aspects of the present disclosure. In some examples, the retail space (e.g., apparel store) may be divided into a front-end "sales floor" 105 for interfacing with the customers and the back-end stockroom 110 for storing excess inventory 125. The front-end 105 and back-end 110 may further be broken down into specific zones proving a specific location. For example, the front-end 105 may provide a hanging rack of products as zone 1A, and an endcap of products of the hanging rack as zone 1B (not shown). In another example, the back-end 110 may provide a shelf as zone 2A, and a hanging rack as 2B (not shown).

As discussed above, retailers (e.g., apparel retailers) have deployed a RFID system in stores to track product movements from when the products arrive at a store, are placed on display on the sales floor, and are sold. By adopting an RFID system, retailers are able to reduce the amount of time that the store employees spend counting the inventory (e.g., manually counting inventor that is on the floor and in stock room), as well as increase merchandise visibility within each store, thereby enabling shoppers in the store and online to find a product, at the location where they need the product. RFID relies radio waves to read and capture information stored on a tag attached to an object. A tag (e.g., EPC tag 120) can be read from up to several feet away and does not need to be within direct line-of-sight of the reader to be tracked.

An RFID system may be made up of two parts: a tag or label (e.g., EPC tags 120 or 130) and a reader (e.g., fixed RFID reader 135 or handheld RFID reader 140). RFID tags or labels 120 or 130 are embedded with a transmitter and a receiver. The RFID component on the tags may include a microchip that stores and processes information, and an antenna to receive and transmit a signal. The EPC tag 120 (or 130) may further contain, inter alia, the specific serial number for each specific object.

To read the information encoded on an EPC tag 120 (or 130), a two-way radio transmitter-receiver called an interrogator or reader (e.g., RFID reader 137 or 140) emits a signal to the EPC tag 120 (or 130) using the antenna (e.g., antenna 137 for fixed RFID reader 135 and internal antennas for mobile RFID reader 140). The EPC tag 120 (or 130) may respond with information (e.g., serial number, size, details about specific product,) written in the memory of the EPC. For purposes of this disclosure, the terms, the EPC tag and RFID tag may be used interchangeably. The EPC tag 120 (or 130) may be a passive tag or a battery powered EPC tag. A passive RFID tag may use the RFIC interrogator or receiver's 140 (or 135) radio wave energy to relay the stored information back to the interrogator. In contrast, a battery powered EPC tag 120 (or 130) may be embedded with a small battery that powers the relay of information.

In a retail setting, EPC tags 120 and 130 may be attached to articles of clothing or any merchandise. When a store employee uses a handheld RFID reader 140 to scan a shelf of jeans or shirts, for example, the store employee is able to differentiate between two pairs of identical jeans based upon the information stored on the RFID tag without the need to individually scan each article of clothing because each pair will have its own serial number and the RFID receiver 140 may be able to read a plurality of EPC tags 120 on the floor of a plurality of different merchandise in one instance.

As such, with one pass of the handheld RFID reader 140, the associate cannot only find a specific pair of jeans, but the RFID reader 140 may also update and output inventory count of how many of each pair are on the shelf. Further, as discussed below, the RFID read 140 may also notify the associate as to which pairs need to be replenished (e.g., blue size 32×30). The employee can learn all of this information without having to scan each product individually.

Retail stores utilizing RFID technology for inventory management generally employ either overhead readers 135 that capture all tags within a specified area or zone, or handheld readers 140 operated by employee to conduct periodic inventory counts. Additionally, other readers of RFID tags (not shown) may also be deployed throughout the retails stores. For example, additional readers may be integrated into or near point of sale systems (POS), readers integrated into the security system of the retail store (e.g., near entry and exit points), readers integrated into or near points of access to the stock rooms. These additional/other readers may not be used for collecting inventory counts when performing a complete scan of the retail location, but can adjust the inventory counts of the handheld devices 140 and inventory database, as described below. The inventory counts/inventory database may be stored and updated in a computer device 400, such as a server, as discussed with Reference to FIG. 4 below, either locally, in the cloud, remote, or a combination thereof.

In either case, inventory counts may be updated by running a complete scan of all areas and/or zones at a retail store at predetermined times via overhead readers 135, or randomly by associates via handheld readers 140. This can lead to a replenishment of products to a sales floor only after these complete scans or random scans occur (e.g., nightly restocking of the sales floor, weekly restocking of the sales floor, whenever an associate notices an empty rack or shelf products). This type of replenishment schedule can lead to a lack of products on a sales floor for customers (i.e., when a major sale occurs and all of the products are purchased very quickly), and an overstock of products in the stock room that may have been purchased by these customers if they were properly placed on the sale floor at the necessary time.

In one example of a detrimental complete scan schedule, may occur when the customer on a Saturday night inquires an associate about a specific product, in a specific size, and a specific color that is lacking from the sales floor. The associate may query the inventory count database and reveal that the retail location had two item Zs (by counting the unique IDs #Z3 and #Z8 on handheld reader 140) on the sales floor and five item Zs (by counting unique IDs #Z2, #Z27, #Z44, #Z53 and #Z101 on handheld reader 140) in the stock room as of the last complete scan of the retail location on Friday night. The associate may spend valuable time looking for unique IDs #Z2, #Z27, #Z44, #Z53 and #Z101 in the stock room. The associate has no knowledge that the retail location sold both item Zs from the sales floor Saturday morning, and a different associate brought the five item Zs out of the stockroom Saturday afternoon only to be sold shortly thereafter. This can lead to an upset customer, and wasted time of the associate searching the stock room for items previously sold. The retail location will find out Saturday night, once another complete scan occurs, that all item Zs are now sold out.

In another example of a detrimental complete scan schedule, may occur when the customer on a Saturday night inquires an associate about a specific product, in a specific size, and a specific color that is lacking from the sales floor in zone 1A. The associate may query the inventory count database and reveal that the retail location had two item Xs (by counting the unique IDs #X4 and #X5 on handheld reader 140) on the sales floor in zone 1A, and one item X (by reading unique ID #X6 on handheld reader 140) in zone 2A, and none in zone 1B, as of the last complete scan of the retail location on Friday night. The associate may spend valuable time looking in the stock room zone 2A for unique ID #X6. The associate has no knowledge that the retail location sold both item Xs from the sales floor zone 1A Saturday morning, and a different associate brought the one item X out of the stockroom Saturday afternoon and placed item #X6 in zone 1B. The associate wastes time looking in the stockroom zone 2A that has already been moved, and the associate and customer do not look in zone 1B because the inventory count database indicates no products are there. This can lead to an upset customer because they fail to acquire the requested product, and the retail location loses a potential sale of item #X6. The retail location will find out Saturday night, once another complete scan occurs, item #X6 is located in zone 1B.

Retailers have generally relied on associates performing random scans of zones within the retail location with handheld readers 140, or nightly complete scans of the entire retail location. This method leads to many inconsistences and errors with the stock of a retail location. To resolve this problem, the present disclosure provides for real-time notifications of low product levels at a specific zone(s) of a retail location, that may be pushed to associate's handheld readers 140, that are triggered by the movement of the RFID tagged items.

As described above, in one aspect of the disclosure, the inventory database is compiled and updated in accordance with each complete scan of the retail location. Each specific zone within the retail location is associated with a unique zone location. Further, each unique RFID tag information is associated with each unique zone. Although this information is highly necessary to track theft and other metrics of the retail location, most associates do not necessarily need all of this data all the time. Associates within the retail location may be concerned mostly about the exact number of specific items located at a specific zone within the retail location. Associates may also need to be notified to replenish the zones in real-time when necessary, as described below.

Figure 2:
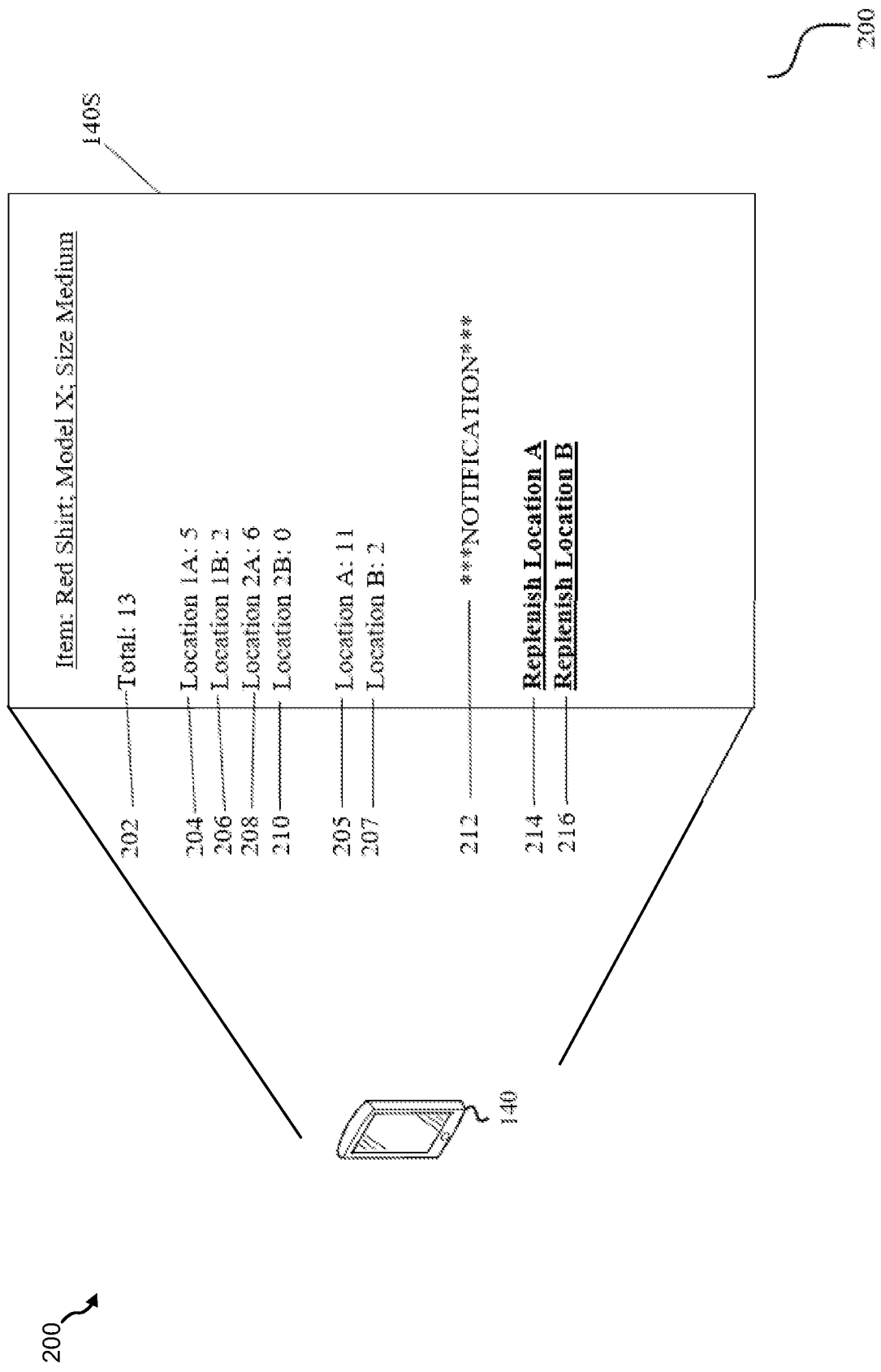
FIG. 2 is an example diagram for providing notifications based on movement of RFID tagged items in an inventory management system.

Turning next to FIG. 2, is an example diagram 200 for providing notifications based on movement of RFID tagged items in an inventory management system 100. Handheld reader 140 is illustrated along with an expanded view of the screen 140S. According to an aspect of the disclosure, the handheld reader may be implemented to query the inventory databased of a specific item, for example, a Red Shirt in size medium as Model X. As shown in FIG. 2, the total number of units 202 may be presented to the associate on the handheld device screen 140S. Rather than provide the associate with unique identification numbers of each of the specific products (e.g., Model X, S/N 0004), the system totals the number of the specific products and presents this total 202. In one example, the handheld device screen 140S may also provide the associate with the specific locations of the query units 202. For example, 204 reports that five units are in zone 1A, 206 reports that two units are in zone 1B, 208 reports that six units are in zone 2A, and 210 reports that zero units are in zone 2B. These numbers may be updated in real-time as described below. As described above, for example, zone A may be considered on the sales floor, and zone B may be considered in the stock room.

As discussed above, these numbers may be updated based upon complete scans of the retail location, or random scans by an associate of the handheld device. Additionally, as RFID tagged items are moved around the store, as described above, they may be read by a plurality of different additional RFID readers. According to another aspect of the disclosure, these additional scans of the RFID tags by the additional RFID readers, may update the handheld devices and/or inventory database in real-time. For example, as discussed above, an RFID tag may be scanned at the POS system RFID reader, thereby inherently indicating that the specific unit has been sold. Upon the RFID reader at the POS system reading the RFID tag, the unit number 202 may be updated (decreased). The unit number may be directly updated in the inventory database or updated on each handheld reader 140 via a notification from the inventory database.

In another example, an RFID tag may be scanned at the entry/exit point of the retail location, thereby inherently indicating that the specific unit has either been sold (and may be crossed checked via the POS RFID reader, discussed above) or considered stolen. Regardless of the unit being sold or stolen, the total unit number 202 may be updated (decreased). In another aspect of the disclosure, in conjunction with the total unit number 202 being updated (decreased), the zone location, for example A, of the sales floor may be updated (decreased). A total number of units may also be displayed on handheld device screen 140S that would be updated (decreased) indicating that the number of units on the sales floor 205 (i.e., location 1A, 5 and location 2A, 6, equals 11). Additionally, the total number of units within the stock room may be displayed as 207, and/or updated, as described above.

The readings of the RFID tags by these additional RFID readers may be considered to be product movement events. As described above, in response to the specific product movement event, the respective unit numbers are updated. Predetermined threshold levels of each of the units numbers, 202, 204, 205, 206, 207, 208 and 210 may be set and/or adjusted by the retail location. Upon a specific unit number reaching or exceeding a threshold, a push notification 212, 214 and 216 may be sent to each handheld device 140 or a specific handheld device (e.g., all the associates in the retail location, only specific department associates, or only a specific associate or manager).

According to one aspect of the disclosure, the retail location may set threshold levels to be the same for every product sold, different for each product or dynamically change. For example, the retail location may set that each product in the retail location have at least 10 items on the sales floor and 1 in the stock room. As described above, and referring back to FIG. 2, a Red Shirt in size medium as Model X has 11 units on the sale floor 205 and 2 in the stock room 207. As described above, the additional RFID reader at the POS system reads the RFID tag for a Red Shirt in size medium as Model X. The system then updates unit 205 to 10. In accordance with an aspect of the disclosure, a push notification is sent to the handheld reader 140. The associate with the handheld reader(s) 140 are notified in real time that the product has reached the threshold level and it should be replenished from the stock room.

Additionally, threshold levels may also be set depending upon specific zones within a retail location. For example, zone 1A may be a table of the items, and zone 2A may be the end cap with the items. Both zones have a threshold level of 5. In one example, upon the push notification being sent to the handheld device 140, indicating that the sales floor needs to be replenished of a specific item. Upon the push notification, the associate may go perform a manual scan of zone 1A and 2A to determine which zone needs the replenishment of the specific item. The associate may then proceed to place or relocate the specific item located in the stock room to the specific zone on the sales floor. The associate may either manually update the handheld device 140 unit numbers or perform an RFID tag scan of the zone once the item has been placed.

In another aspect of the disclosure, and as described above, additional RFID readers may be placed at the entrance and exit to the stock room. For example, as described above, a push notification may be sent to the mobile device, which may for example be any one of the aforementioned scanners indicating an item has reached the threshold level on the sales floor. In addition, the mobile device may further include a POS system, a mobile phone, a tablet or other mobile device in communication with the inventory management system. Base on the notification, the associate may determine that two of these items are located in the stock room zone 1B, as shown by 206. Upon the associate removing the item from the stock room, the additional RFID reader near the stock room may scan the RFID tag, thereby update the unit number 207 in real-time to 1. The associate places the item in zone 1A, and may update the number on the handheld device 140 manually or by scanning the zone. As described above, the number of units are updated in real-time and can be accessed by an associate on a handheld device 140, via a computer terminal or remotely via the headquarters of the retail location.

As described above, the stock room, zone B, may also have specific threshold levels set. In one example, once the stock room has reached threshold level 1. Upon the update of 207, via the associate bringing a product from the stockroom to the sales floor, a push notification may be sent to handheld device 140 indicating that additional units of the specific item need to be ordered or obtained from a different retail location.

According to an additional aspect of the disclosure, the system may proceed in an opposite direction. Rather than the system updating the unit counts to lower numbers upon sales or movement of the RFID tagged items, the system may update and send notifications as new shipments and products are acquired by the retail location.

For example, the retail location receives a shipment of products via a delivery service. Upon receipt, an associate performs a scan of the box of items via the handheld device 140 of the RFID tags. The system updates the unit counts in the retail location, for example 202 and 207. Based on a comparison of the threshold levels for the sales floor 205 and sales floor locations 204 and 208, if necessary, push notifications may be sent to the handheld device 140 indicating that a product has been received and the items should be moved or relocated to the sales floor. For example, the item has been sold out of the retail location, but upon receipt of the 25 Red Shirt in size medium as Model X, a push notification may be sent indicating that 11 should be placed on the sales floor with at least 5 in zone 1A and 6 in zone 1B (based on the example threshold values discussed above). In other words, the push notifications are generated based on the triggering events described above.

Figure 3:
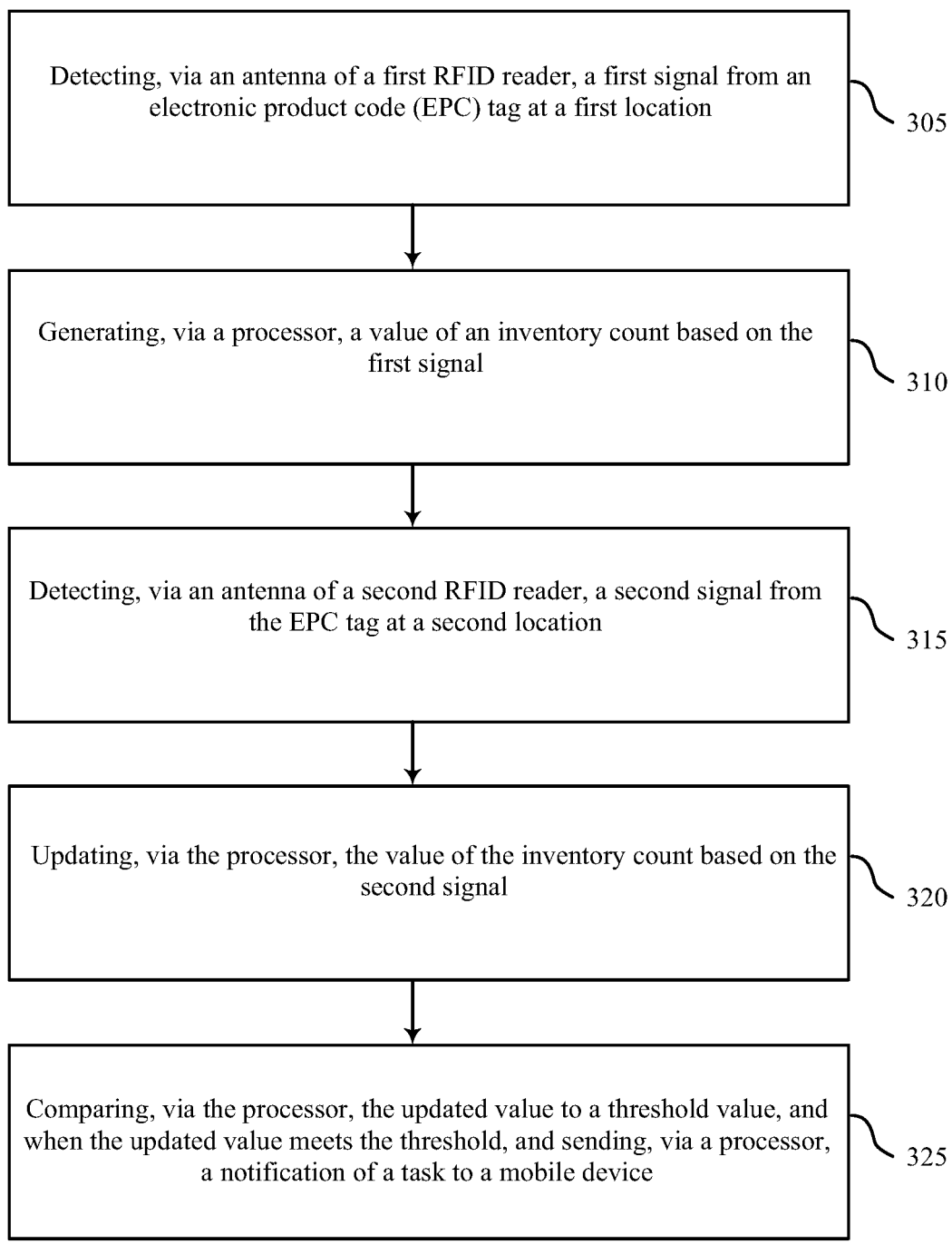
FIG. 3 is an example flowchart for inventory management system in accordance with aspects of the present disclosure.

FIG. 3 is flowchart 300 for inventory management utilizing radio-frequency identification (RFID) technology in accordance with aspects of the present disclosure. Aspects of flowchart 300 may be performed by the RFID readers as described with reference to FIG. 1 and/or by a computer device 400 in communication with the RFID reader as described with reference to FIG. 4.

At block 305, the method 300 may include detecting, via an antenna of a first RFID reader, a first signal from an electronic product code (EPC) tag at a first location. Aspects of block 305 may be performed by communications component 415 and more particularly by one or more antennas (e.g., antenna 137) associated with the one or more RFID readers.

At block 310, the method 300 may include generating, via a processor, a value of an inventory count based on the first signal. Aspects of block 310 may be performed by the inventory management system 425 described with reference to FIG. 4.

At block 315, the method 300 may include detecting, via an antenna of a second RFID reader, a second signal from the EPC tag at a second location. Aspects of block 315 may also be performed by communications component 415 and more particularly by one or more antennas associated with the one or more RFID readers 140 and additional RFID readers (not shown).

At block 320, the method 300 may include updating, via the processor, the value of the inventory count based on the second signal. Aspects of block 320 may be performed by the inventory management system 425 described with reference to FIG. 4.

At block 325, the method 300 may include comparing, via the processor, the updated value to a threshold value, and when the updated value meets the threshold; and sending, via a processor, a notification of a task to a mobile device. Outputting notification may comprise displaying the notification on a display device associated with the RFID reader or a separate computer.

Figure 4:
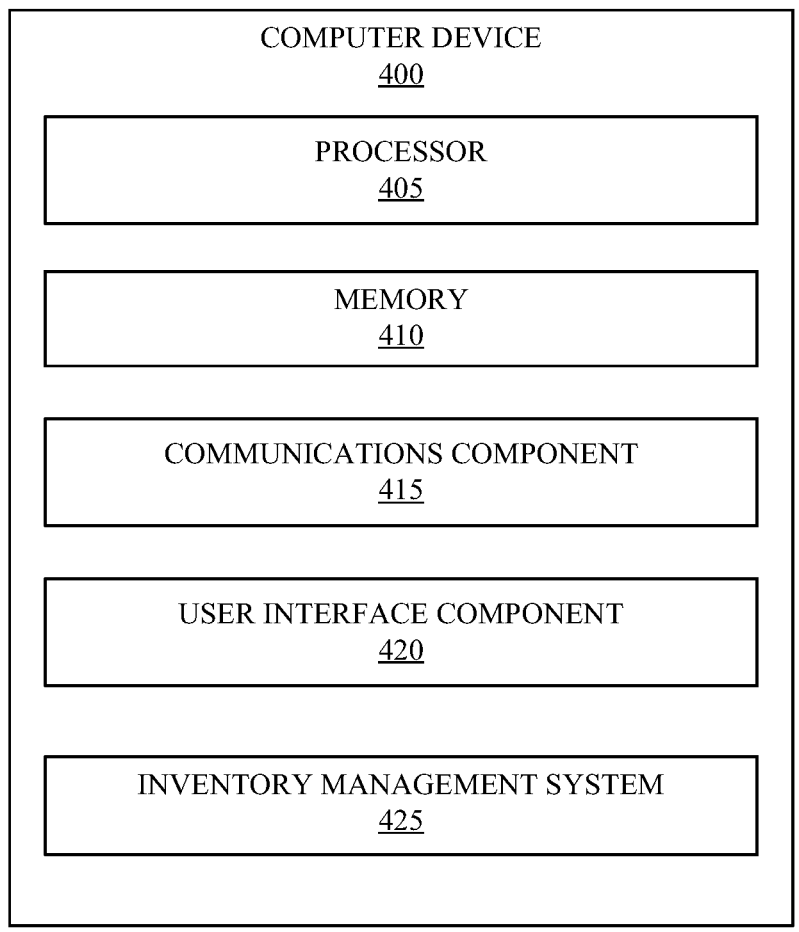
FIG. 4 is diagram illustrating an example of a hardware implementation for the computer device in accordance with various aspects of the present disclosure.

Referring now to FIG. 4, a diagram illustrating an example of a hardware implementation for the computer device 400 in accordance with various aspects of the present disclosure is described. In some examples, the computer device 400 may be an example of the fixed RFID reader, handheld RFID reader, or a backend computer device such as a standalone computer or a server in communication with one or more RFID readers that capture signals from one or more EPC tags with reference to FIG. 1.

The computer device 400 may include a processor 405 for carrying out one or more processing functions (e.g., method 300) described herein. The processor 405 may include a single or multiple set of processors or multi-core processors. Moreover, the processor 405 can be implemented as an integrated processing system and/or a distributed processing system.

The computer device 400 may further include a memory 410, such as for storing local versions of applications being executed by the processor 405. In some aspects, the memory 410 may be implemented as a single memory or partitioned memory. In some examples, the operations of the memory 410 may be managed by the processor 405. Memory 410 can include a type of memory usable by a computer, such as random access memory (RAM), read only memory (ROM), tapes, magnetic discs, optical discs, volatile memory, nonvolatile memory, and any combination thereof. Additionally, the processor 405, and memory 410, may include and execute operating system (not shown).

Further, the computer device 400 may include a communications component 415 that provides for establishing and maintaining communications with one or more parties utilizing hardware, software, and services as described herein. Communications component 415 may carry communications between components and modules of the computer device 400. The communications component 415 may also facilitate communications with external devices to the computer device 400, such as to electronic devices coupled locally to the computer device 400 and/or located across a communications network and/or devices serially or locally connected to the computer device 400. For example, communications component 415 may include one or more buses operable for interfacing with external devices.

The computer device 400 may include a user interface component 420 operable to receive inputs from a user of the computer device 400 and further operable to generate outputs for presentation to the user. The user interface component 400 may include one or more input devices, including but not limited to a navigation key, a function key, a microphone, a voice recognition component, any other mechanism capable of receiving an input from a user, or any combination thereof. For example, the user interface component 420 may include a trigger to initiate a RFID scan for inventory management. Further, user interface component 420 may include one or more output devices, including but not limited to a display, a speaker, any other mechanism capable of presenting an output to a user, or any combination thereof.

The computer device 400 may further include an inventory management system 425 to perform one or more techniques discussed in this application, including providing a notification for an actionable notification event, and/or providing real-time inventory data of specific products (e.g., a number of specific products located within the retail location, and/or the specific location within the retail location of the specific product).

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a handheld RFID reader, a mobile device, cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for inventory management utilizing radio-frequency identification (RFID) technology comprising:

detecting by a first antenna of a first RFID reader, an electronic product code (EPC) tag affixed to a product at a first location wherein the EPC tag generates and transmits a first signal comprising a serial number, a size, and a product detail, and wherein the first signal is generated based upon a complete scan of a sales floor of a retail location;

generating, by a processor, a value of an inventory count based on the first signal comprising the serial number, the size, and the product detail at the first location;

detecting by a second antenna of a second RFID reader, the EPC tag affixed to the product at a second location wherein the EPC tag generates and transmits a second signal comprising the serial number, the size, and the product detail, and wherein the second signal is generated based upon the second RFID reader located at a point of sale system (POS);

updating, by the processor, the value of the inventory count to an updated value based on the second signal comprising the serial number, the size, and the product detail at the second location;

comparing, by the processor, the updated value to a threshold, and determining when the updated value satisfies the threshold; and sending, by the processor, a notification of a task to a mobile device when the updated value satisfies the threshold indicating a second EPC tag affixed to a second product to be moved from a third location to the first location, wherein the third location is a stock room of the retail location, and wherein the second EPC tag is indicated based on a serial number, a size, and a product detail of the second product and the serial number, the size, and the product detail from the EPC tag affixed to the product, and wherein the threshold is dynamically adjusted based upon the retail location, wherein the first location and the third location are associated with respective thresholds each having a different value, and wherein the notification of the task is sent to the mobile device of a selected group of users, and the task indicates in real-time that the second EPC tag affixed to the second product is to be moved from the third location to the first location.

2. The method of claim 1, wherein updating the value of the inventory count is based upon a product comprising the EPC tag being removed from the second location.

3. The method of claim 2, wherein the updated value is reduced by one.

4. The method of claim 1, wherein updating the value of the inventory count is based upon a product comprising the EPC tag being added to the third location.

5. The method of claim 4, wherein the updated value is increased by one.

6. The method of claim 1, wherein the inventory count is a total number of an item type each comprising a different EPC tag.

7. The method of claim 1, wherein the POS is configured to be a fixed RFID reader or a mobile RFID reader.

8. An apparatus for inventory management utilizing radio-frequency identification (RFID) technology, comprising:
a first RFID reader and a second RFID reader;
a memory configured to store instructions; and
a processor communicatively coupled with the memory, the processor configured to:
receive, by a first antenna of the first RFID reader, a first signal comprising a serial number, a size, and a product detail from an electronic product code (EPC) tag affixed to a product at a first location, wherein the first signal is generated based upon a complete scan of a sales floor of a retail location;
generate a value of an inventory count based on the first signal comprising the serial number, the size, the product detail at the first location;
receive, by a second antenna of the second RFID reader, a second signal comprising the serial number, the size, and the product detail from the EPC tag affixed to the product at a second location, wherein the second signal is generated based upon the second RFID reader located at a point of sale system (POS);
update the value of the inventory count based on the second signal comprising the serial number, the size, the product detail at the second location;
compare the updated value to a threshold, and determining when the updated value satisfies the threshold; and
send a notification of a task to a mobile device when the updated value satisfies the threshold indicating a second EPC tag affixed to a second product to be moved from a third location to the first location, wherein the third location is a stock room of the retail location, and wherein the second EPC tag is indicated based on a serial number, a size, a product detail of the second product and the serial number, the size, the product detail from the EPC tag affixed to the product,
wherein the threshold is dynamically adjusted based upon the retail location;
wherein the first location and the third location are associated with respective thresholds each having a different value, and
wherein the notification of the task is sent to the mobile device of a selected group of users, and the task indicates in real-time that the second EPC tag affixed to the second product is to be moved from the third location to the first location.

9. The apparatus of claim 8, wherein updating the value of the inventory count is based upon a product comprising the EPC tag being removed from the second location.

10. The apparatus of claim 9, wherein the updated value is reduced by one.

11. The apparatus of claim 8, wherein updating the value of the inventory count is based upon a product comprising the EPC tag being added to the third location.

12. The apparatus of claim 11, wherein the updated value is increased by one.

13. The apparatus of claim 8, wherein the inventory count is a total number of an item type each comprising a different EPC tag.

14. The apparatus of claim 8, wherein POS is configured to be a fixed RFID reader or a mobile RFID reader.

* * * * *